United States Patent
Qian

(10) Patent No.: US 9,081,169 B2
(45) Date of Patent: Jul. 14, 2015

(54) ONE PIECE LIGHT BEAM TWISTER

(71) Applicant: Dingrong Qian, Fremont, CA (US)

(72) Inventor: Dingrong Qian, Fremont, CA (US)

(*) Notice: Subject to any disclaimer, the term of this patent is extended or adjusted under 35 U.S.C. 154(b) by 302 days.

(21) Appl. No.: 13/647,493

(22) Filed: Oct. 9, 2012

(65) Prior Publication Data

US 2014/0098435 A1    Apr. 10, 2014

(51) Int. Cl.
*G02B 5/08* (2006.01)
*G02B 17/02* (2006.01)
*G02B 19/00* (2006.01)

(52) U.S. Cl.
CPC .......... *G02B 17/026* (2013.01); *G02B 19/0019* (2013.01); *G02B 19/0057* (2013.01)

(58) Field of Classification Search
CPC ........ G02B 27/09; G02B 5/12; G02B 17/026; G02B 19/0019
USPC .......................................... 359/856, 857, 861
See application file for complete search history.

(56) References Cited

U.S. PATENT DOCUMENTS 3,460,046 A * 8/1969 Arnaud ........................ 359/348

* cited by examiner

*Primary Examiner* — Euncha Cherry

(57) ABSTRACT

A beam twister consists of roof reflector-mirror pair is described. The pair reflects incoming light beam and, in the meantime, rotates the beam around its propagating direction by 90 degrees. For beam array, its size-divergence product can be changed by an array of the pairs, which makes it possible to focus the beam array into small spot. If the pair is integrated into a solid piece, the device is very robust and works with wide optical spectrum and high damage threshold.

13 Claims, 3 Drawing Sheets

Array of basic unit, integrated & internal reflection

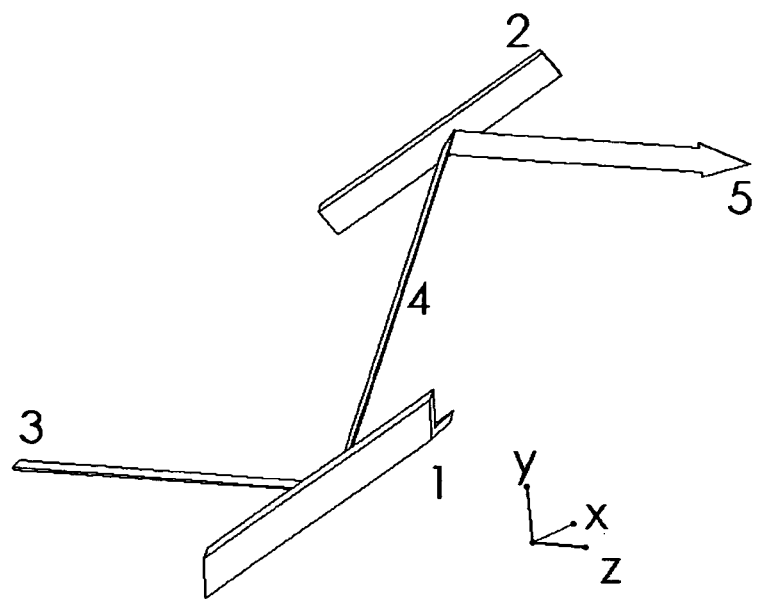
Fig. 1  Basic unit
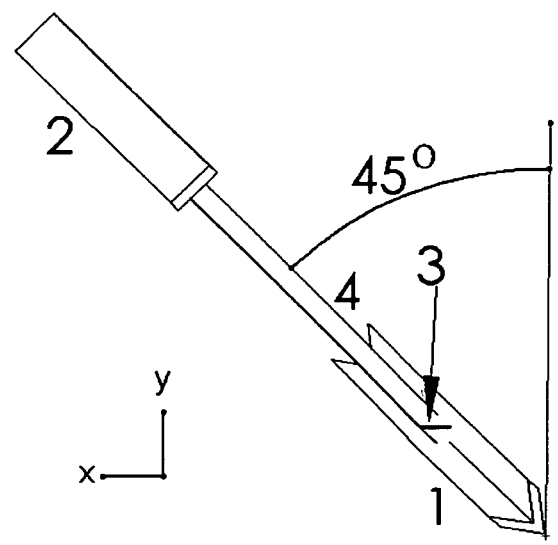
Fig. 2  View in X-Y plane, basic unit

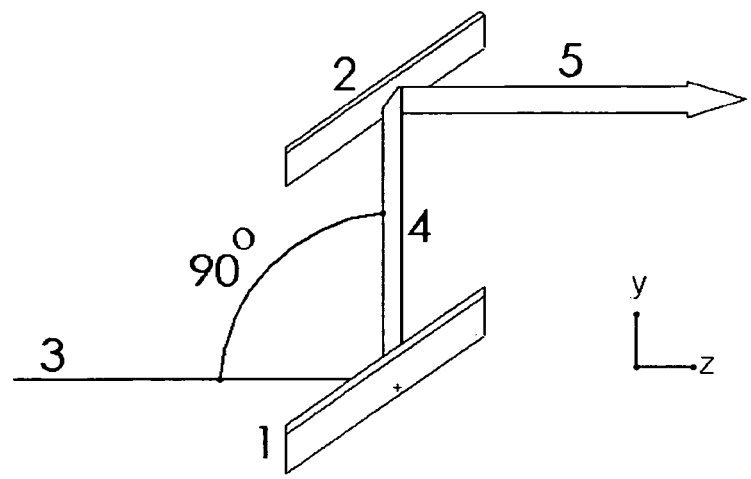
Fig. 3 View in Y-Z plane, basic unit
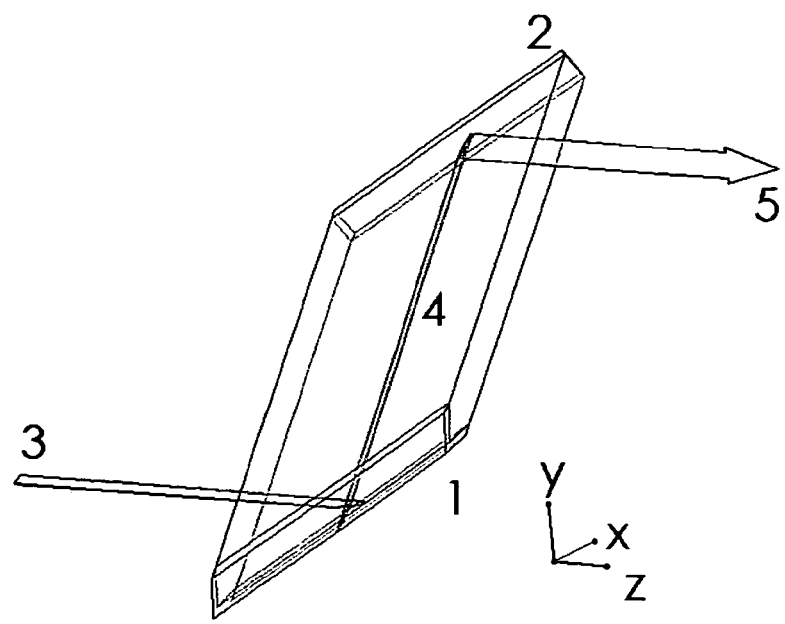
Fig. 4 Basic unit, integrated

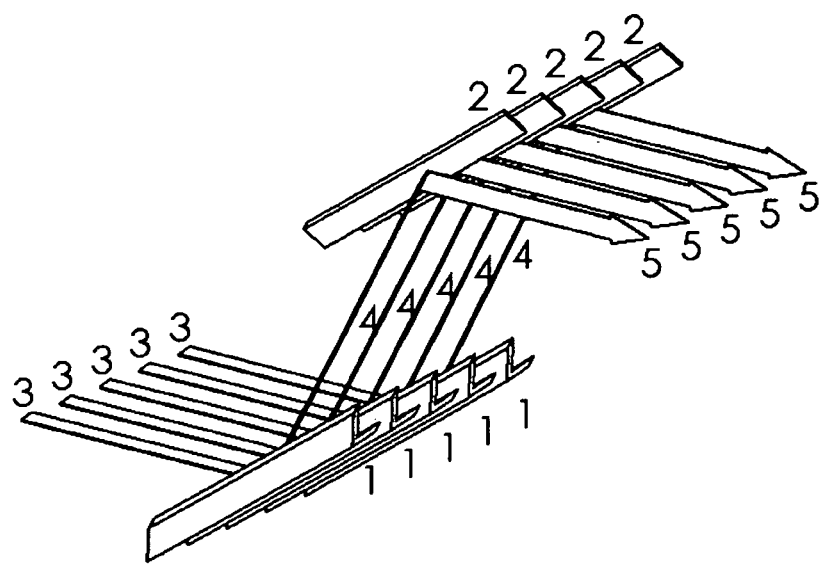
Fig. 5 Array of basic unit, external reflection
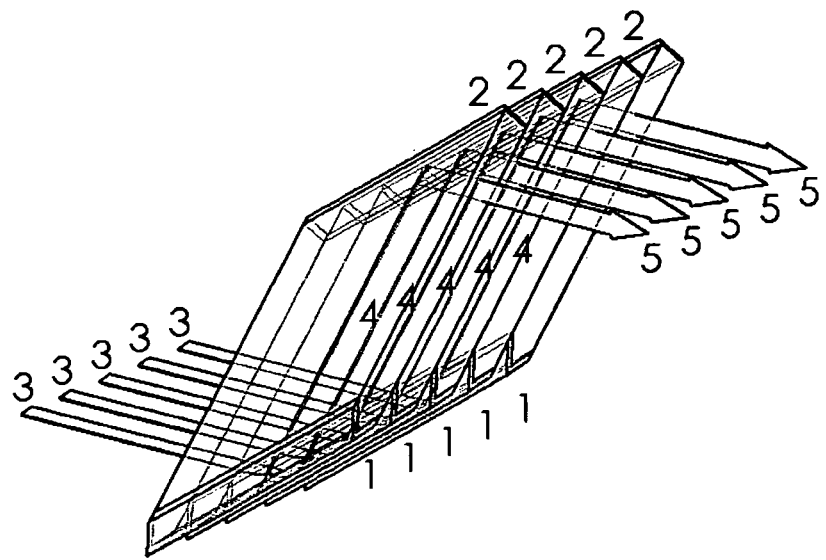
Fig. 6 Array of basic unit, integrated & internal reflection

ONE PIECE LIGHT BEAM TWISTER

TECHNICAL FIELD

This invention relates generally to optical systems and, more particularly, to a beam twisting apparatus for light beam array from semiconductor laser to achieve symmetric size-divergence product in their lateral and transverse directions.

REFERENCE CITED

U.S. PATENT DOCUMENTS

| | | | |
|---|---|---|---|
| 4,763,975 | August 1988 | Scifres et al. | 350/96.15 |
| 5,168,401 | December 1992 | Endriz et al. | 359/625 |
| 5,592,333 | January 1997 | Lewis | 359/628 |
| 6,240,116 | May 2001 | Lang et al. | 372/50 |
| 6,324,190 | November 2001 | Du et al. | 372/9 |
| 8,767,304 | July 2014 | Xiao et al. | 359/629 |

BACKGROUND

It is well-known that the size-divergence product (SDP) of a light beam is an optical invariance throughout an optical system.

It is also well-known that the properties of light beam from edge emitting semiconductor laser, or diode laser, are quite different from other laser beams in that its SDP in lateral direction (X), the direction parallel to its PN junction or quantum well plane, and SDP in transverse directions (Y), the direction perpendicular to PN junction or quantum well plane, are quite different which causes substantial difficulties in diode laser applications where a uniform beam property is required, for example to focus the beam into a small round spot.

To overcome the difficulty caused by the inherent asymmetric property of edge emitting diode laser, techniques have been developed which successfully reformed the laser beam, such as U.S. Pat. Nos. 5,168,401, No. 5,592,333, No. 6,240,116 and No. 4,763,975. U.S. Pat. No. 5,592,333 employs roof reflectors with dihedral angles of 60° and 70.5°, but beam overlapping in lateral direction is an issue which prevents it from focusing into small spot. In our recent patent (U.S. Pat No. 8,767,304), array of roof reflector is employed for beam twisting wherein polarized beam splitter (PBS) is used to de-couple the twisted array of light beams.

This invention adds one more approach to the effort in beam twisting for edge emitting diode laser beam. It is very compact and reliable and the optical efficiency is very high. In addition, its damage threshold and optical spectrum are limited by material properties when integrated version is employed.

SUMMARY OF THE INVENTION

This invention is to manipulate array of light beams to change its SDP in lateral (X) and transverse (Y) directions.

This invention, particularly, is a light beam twister which is a device to rotate light beam around its propagating direction (Z) by 90 degrees and deliver it to a desired direction. When a light beam incidents on the device, it is first reflected by a roof reflector which rotates the beam around its propagating direction by 90 degrees, then the beam is sent to a mirror and reflected by the mirror to exit the device. For an array of light beams, a corresponding array of beam twisters can be used, then all of the light beams will be twisted individually and, as a result, the configuration of the array of light beams, or SDPs of the array, is changed. Thus the new array of light beams is ready for focusing into a small spot.

BRIEF DESCRIPTION OF DRAWINGS

FIG. 1 presents the basic unit of this invention, light beam twister, consisting of a pair of roof reflector (1) and reflection mirror (2). Incoming light beam (3) propagating on Z direction is incident on roof reflector (1), and is reflected (4) to the mirror (2), there the beam is reflected again by the mirror and exits the device (5).

FIG. 2 presents view of the basic unit in X-Y plane where the roof reflector (1) is rotated about Y direction by 45°. Reflected right beam (4) is propagating 45° from Y direction.

FIG. 3 presents view of the basic unit in Y-Z plane where the roof reflector is rotated about X direction by 45°. Reflected light beam (4) is propagating in a direction 90° from Z direction.

FIG. 4 presents one of the embodiments of this invention consisting of roof reflector (1) and reflection mirror (2) but they are integrated into one piece made of material transparent to light beam, the light reflection on roof reflector and mirror can be either by coating on them which is seen in the drawing or simply total internal reflection (TIR).

FIG. 5 presents one of the embodiments of this invention consisting of a number of basic units of this invention described in FIG. 1 to form an array to manipulate array of light beams.

FIG. 6 presents one of the embodiments of this invention consisting of a number of integrated basic units of this invention described in FIG. 4 to form an array to manipulate array of light beams.

DETAILED DESCRIPTION OF THE INVENTION

FIG. 1 presents the basic unit of this invention which is a pair of roof reflector-mirror. The pair consists of a roof reflector (1) and a reflection mirror (2). Incoming light beam (3) is shining on roof reflector first, then is reflected (4) by it to the mirror and is reflected by the mirror to exit the device (5). The roof reflector consists of two planar mirrors, their intercept line is ridge of the roof reflector; the dihedral angle is 90°. The roof reflector is placed to accept incoming light beam propagating along Z direction to its opening.

There are two 45° rotations for a working roof reflector. The first 45° rotation (FIG. 2) is about Z direction which is perpendicular to drawing plane of FIG. 2. The second 45° rotation (FIG. 3) is about X direction which is perpendicular to drawing plane of FIG. 3. It should be pointed out that 45° rotation or −45° rotation makes no essential difference.

With these two rotations, the beam reflected by the roof reflector will be propagating 45° from Y direction in X-Y plane (FIG. 2) and 90° from Z direction in Y-Z plane (FIG. 3). The first rotation about Z direction, under certain circumstance, can be other than 45° when beam rotation around its propagation direction other than 90° is needed. And the second rotation about X direction can be other than 45°, too, when beam propagation direction other than 90° from Z direction in Y-Z plane is needed. Furthermore, the dihedral angle of the roof reflector can be other than 90° for special application purpose.

The function of reflection mirror (2) is to reflect light beam to desired direction which is Z direction in FIG. 1 and FIG. 3, but it does not have to be Z direction; it can be, in general, any direction for specific application purpose.

The mirror, in any case, should be arranged to accept light beam from roof reflector and reflect the beam to a desired direction. The roof reflector and mirror so far are one-to-one in the basic unit (FIG. 1). However, the basic unit can have more than one roof reflector-to-one reflection mirror or one roof reflector-to-more than one reflection mirror. Moreover, the desired direction does not have to be in Z direction, it can be any direction and each individual reflection mirror can have its own direction for specific application purposes.

The basic function of the reflection mirror is to re-direct light beam, but a reflection mirror with curvature will add additional function to it.

Typically, a roof reflector in FIG. 1 fully accepts one light beam, but it can accept, generally speaking, part of a beam or more than one beam.

The light reflections on roof reflector and reflection mirror described so far (FIG. 1, FIG. 2, FIG. 3 and FIG. 5) are external reflection. Actually, the light reflection by each of them can be either external reflection or internal reflection including total internal reflection (TIR). One of the cases is described in FIG. 4 where both roof reflector and mirror are integrated into one piece made of material transparent to light beam and reflection coatings are seen on the back side of both roof reflector and mirror. However, when the index of refraction of the material is large enough, the reflection coating is not necessary, light reflection, in this case, is TIR. Functionally, external reflection and internal reflection are identical, but mechanically they are different. In integrated version, tolerances are built in the device and fixed by manufacture and TIR guarantees high reflection efficiency and high damage threshold.

Multiple pairs of roof reflector-mirror constitute an array (FIG. 5 and FIG. 6). The array can treat one or more arrays of light beams to change their configuration. The design of array of roof reflector-mirror pair mainly depends on what configuration of the light beams out of the device is expected. Moreover, the roof reflector-mirror pairs in an array can be either identical or non-identical.

When array of light beam is treated by corresponding array of roof reflector-mirror pairs, its configuration change is the combined consequence of light reflections by roof reflector where dihedral angle, rotations about Z and X directions are all decisive and light reflection by mirror where mirror position, shape and orientation are also decisive. There are a number of possibilities to choose the way the pair should be constructed. This is the reason why this invention is so powerful and versatile.

Light polarization has no effect in the function of light beam twister.

What is claimed is:

1. An optical apparatus to individually twist light beams in light beam array by array of basic units, the basic unit comprising:
    roof reflector (RR) consisting of two planar mirrors which form a dihedral angle, their intercept line is the ridge of the RR, the ridge is at Y direction and the open side of the RR faces Z direction, then the RR is rotated twice, the first rotation is about Z direction in X-Y plane and the second rotation is about X direction in Y-Z plane;
    reflection mirror arranged to reflect light beam from the RR to desired direction.

2. An optical apparatus in claim 1 wherein the dihedral angle is 90°.

3. An optical apparatus in claim 1 wherein the dihedral angle is not 90°.

4. An optical apparatus in claim 1 wherein the first rotation is 45°.

5. An optical apparatus in claim 1 wherein the first rotation is other than 45°.

6. An optical apparatus in claim 1 wherein the second rotation is 45°.

7. An optical apparatus in claim 1 wherein the second rotation is other than 45°.

8. An optical apparatus in claim 1 wherein the reflection mirror is planar.

9. An optical apparatus in claim 1 wherein the reflection mirror has curvature.

10. An optical apparatus in claim 1 wherein the basic units are identical.

11. An optical apparatus in claim 1 wherein not all the basic units are identical.

12. An optical apparatus in claim 1 wherein light reflection on mirror is external reflection.

13. An optical apparatus in claim 1 wherein light reflection on mirror is internal reflection.

* * * * *